United States Patent
Kang et al.

(10) Patent No.: US 9,372,083 B2
(45) Date of Patent: Jun. 21, 2016

(54) DEVICE AND METHOD FOR DETERMINING POSITION INFORMATION USING ACCELEROMETERS ON A ROTATING COMPONENT

(75) Inventors: Keunmo Kang, South Windsor, CT (US); William A. Veronesi, Hartford, CT (US); Robert K. Thornton, Coventry, CT (US); Daryl J. Marvin, Farmington, CT (US)

(73) Assignee: Otis Elevator Company, Farmington, CT (US)

( * ) Notice: Subject to any disclaimer, the term of this patent is extended or adjusted under 35 U.S.C. 154(b) by 420 days.

(21) Appl. No.: 13/978,722

(22) PCT Filed: Jan. 13, 2011

(86) PCT No.: PCT/US2011/021050
§ 371 (c)(1),
(2), (4) Date: Jul. 9, 2013

(87) PCT Pub. No.: WO2012/096662
PCT Pub. Date: Jul. 19, 2012

(65) Prior Publication Data
US 2013/0283907 A1    Oct. 31, 2013

(51) Int. Cl.
*B66B 1/34* (2006.01)
*G01C 19/00* (2013.01)

(52) U.S. Cl.
CPC ............. *G01C 19/00* (2013.01); *B66B 1/3492* (2013.01)

(58) Field of Classification Search
CPC .................. B66B 1/3492; G01C 19/00
USPC ............ 187/247, 391, 393; 318/90, 276; 324/207.25
See application file for complete search history.

(56) References Cited

U.S. PATENT DOCUMENTS

| | | | | |
|---|---|---|---|---|
| 3,766,787 A | * | 10/1973 | Irvine | G01P 15/132 73/514.02 |
| 4,240,296 A | | 12/1980 | Kolodziej | |
| 4,507,607 A | * | 3/1985 | Caputo | B66B 1/3492 324/164 |
| 5,142,485 A | | 8/1992 | Rosenberg et al. | |
| 5,218,282 A | | 6/1993 | Duhame | |

(Continued)

FOREIGN PATENT DOCUMENTS

| | | |
|---|---|---|
| CN | 101187558 | 5/2008 |
| CN | 201133818 | 10/2008 |

(Continued)

OTHER PUBLICATIONS

State Intellectual Property Office of People's Republic China, First Search for Application No. 201180064916.8 dated Mar. 26, 2014.

(Continued)

*Primary Examiner* — Anthony Salata
(74) *Attorney, Agent, or Firm* — Carlson, Gaskey & Olds

(57) ABSTRACT

An exemplary device for determining a position of a component moved by operation of a motor includes a rotating member that rotates responsive to operation of the motor. At least one accelerometer is supported on the rotating member. The accelerometer provides at least one of an indication of a tangential force that is tangential to a direction of rotation of the rotating member and a radial force that is perpendicular to the tangential force. A controller determines the position of the component based upon the force indication from the accelerometer.

22 Claims, 3 Drawing Sheets

(56) References Cited

U.S. PATENT DOCUMENTS

| | | | |
|---|---|---|---|
| 5,336,983 A * | 8/1994 | Watanabe | G01P 15/0888 318/560 |
| 5,635,689 A | 6/1997 | Shepard et al. | |
| 5,825,113 A | 10/1998 | Lipo et al. | |
| 6,050,368 A * | 4/2000 | Pakarinen | B66B 1/30 187/293 |
| 6,164,416 A * | 12/2000 | Laine | B66B 1/285 187/284 |
| 6,173,813 B1 | 1/2001 | Rebillard et al. | |
| 6,246,193 B1 | 6/2001 | Dister | |
| 6,492,788 B1 | 12/2002 | Agirman et al. | |
| 6,502,055 B1 | 12/2002 | Reiner et al. | |
| 6,873,931 B1 * | 3/2005 | Nower | G01B 11/272 702/151 |
| 6,979,967 B2 | 12/2005 | Ho | |
| 7,143,001 B2 * | 11/2006 | Karasek | B66B 1/3492 702/141 |
| 7,409,738 B2 | 8/2008 | Borras et al. | |
| 7,425,205 B2 * | 9/2008 | Shue | A61M 5/3234 604/110 |
| 7,484,598 B2 * | 2/2009 | Tyni | B66B 5/0025 187/291 |
| 7,958,970 B2 * | 6/2011 | Ma | B66B 9/187 187/283 |
| 9,033,114 B2 * | 5/2015 | Mizon | B66B 1/00 187/247 |
| 2006/0020416 A1 | 1/2006 | Karasek | |
| 2009/0039810 A1 | 2/2009 | Gotz et al. | |
| 2010/0135800 A1 * | 6/2010 | Melius | F03D 7/02 416/44 |
| 2013/0127165 A1 * | 5/2013 | Vihriala | F03D 7/02 290/44 |

FOREIGN PATENT DOCUMENTS

| | | | |
|---|---|---|---|
| CN | 101531302 A | | 9/2009 |
| EP | 2216284 A1 | | 8/2010 |
| JP | 11132876 A | * | 5/1999 |
| JP | 2004295429 A | | 10/2004 |
| JP | 2005156496 A | | 6/2005 |
| JP | 2005255273 A | | 9/2005 |
| JP | 2006008333 A | | 1/2006 |
| JP | 2006131405 A | | 5/2006 |
| JP | 2007155584 A | | 6/2007 |
| JP | 2009145199 A | | 7/2009 |
| JP | 2009236821 A | | 10/2009 |
| RU | 2104490 C1 | | 2/1998 |
| WO | 2006100577 A1 | | 9/2006 |

OTHER PUBLICATIONS

International Preliminary Report on Patentability for International application No. PCT/US2011/021050 dated Jul. 25, 2013.

Analog Devices, Programmable 360 Inclinomer, ADIS6203, pp. 1-28.

International Search Report and Written Opinion of the International Searching Authority for International application No. PCT/US2011/021050 dated Oct. 18, 2011.

State Intellectual Property Office of People's Republic China, Supplementary Search, Application No. 201180064916.8 dated Dec. 23, 2014.

* cited by examiner

DEVICE AND METHOD FOR DETERMINING POSITION INFORMATION USING ACCELEROMETERS ON A ROTATING COMPONENT

BACKGROUND

There are a variety of situations in which component position becomes important for system control. Motor control is one example scenario. There are known motor control techniques. Position information regarding motor components is useful for controlling the motor, itself.

Position information regarding the motor is also useful for determining positions of other components that move responsive to operation of the motor. In elevator systems, for example, the position of the elevator car is determined by keeping track of position information regarding the motor. Many arrangements include encoders associated with the motor for purposes of determining position information. While such arrangements have proven useful, it would be beneficial to have a lower-cost alternative to the encoder-based position determination techniques.

SUMMARY

An exemplary device for determining a position of a component moved by operation of a motor includes a rotating member that rotates responsive to operation of the motor. At least one accelerometer is supported on the rotating member. The accelerometer provides an indication of at least one of a tangential force that is tangential to a direction of rotation of the rotating member and a radial force that is perpendicular to the tangential force. A controller determines the position of the component based upon the force indication from the accelerometer.

An exemplary method of determining a position of a component moved by operation of a motor includes providing at least one accelerometer on a rotating member that rotates responsive to operation of the motor. An indication of at least one of a tangential force that is tangential to a direction of rotation of the rotating member and an indication of a radial force that is perpendicular to the tangential force is used for determining the position of the component.

An exemplary elevator system includes an elevator car. A machine includes a motor. A traction sheave rotates responsive to operation of the motor. A traction and suspension assembly supports the elevator car and moves over the traction sheave to cause corresponding movement of the elevator car. At least one accelerometer is supported on a rotating member that rotates when the motor operates. The accelerometer provides at least one of an indication of a tangential force that is tangential to a direction of rotation of the rotating member and a radial force that is perpendicular to the tangential force. A controller determines a position of the elevator car based on the force indication from the accelerometer.

The various features and advantages of disclosed examples will become apparent to those skilled in the art from the following detailed description. The drawings that accompany the detailed description can be briefly described as follows.

DETAILED DESCRIPTION

Figure 1:
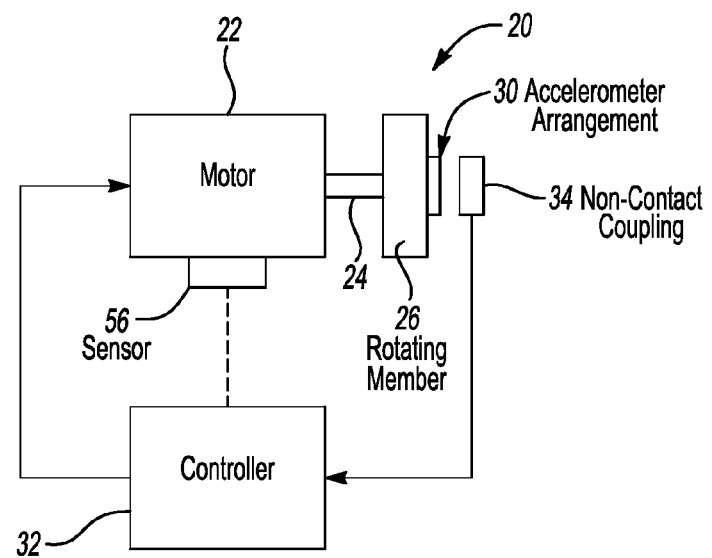
FIG. 1 schematically illustrates an exemplary device useful for determining a position of a component that moves because of operation of a motor.

FIG. 1 schematically shows a device 20 for determining a position of a component of interest. The component of interest moves responsive to operation of a motor 22. In this example, the motor 22 is a rotary electric machine that causes rotation of an output shaft 24. A rotating member 26 is associated with the motor 22 so that the rotating member 26 rotates responsive to operation of the motor 22.

An accelerometer arrangement 30 is supported on the rotating member 26 to provide information to a controller 32 that determines the position of the component of interest. Given that the rotating member 26 rotates, a non-contact coupling 34 facilitates communicating signals from the accelerometer arrangement 30 to the controller 32. The non-contact coupling 34 could also facilitate providing power to the accelerometer arrangement 30 as needed.

Figure 2:
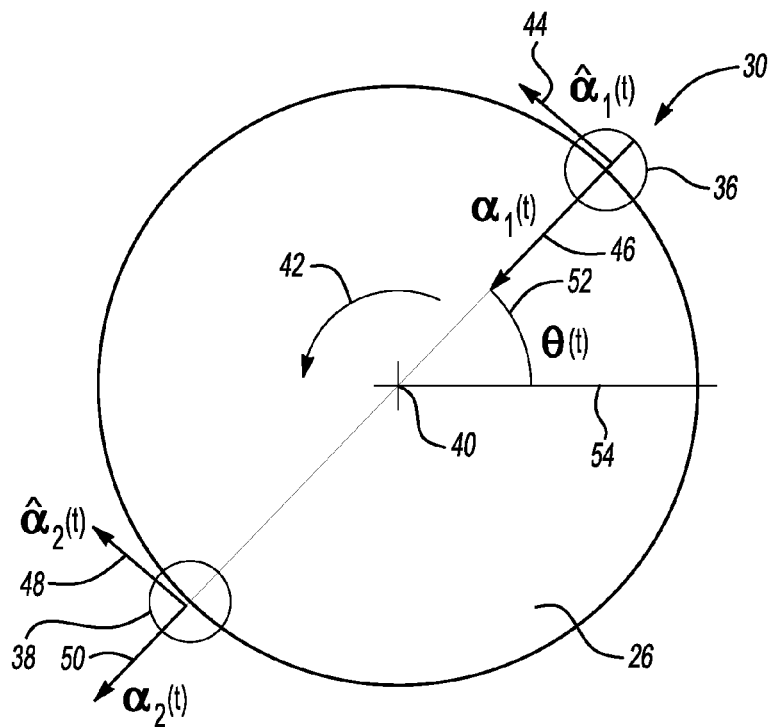
FIG. 2 schematically illustrates selected portions of the example of FIG. 1.

Referring to FIG. 2, one example accelerometer arrangement 30 includes a first accelerometer 36 and a second accelerometer 38. In this example, the accelerometers 36 and 38 are supported on the rotating member 26 diametrically opposed from each other on opposite sides of an axis of rotation 40 about which the rotating member 26 rotates. The direction of rotation in this example is schematically shown by the arrow 42.

The first accelerometer 36 provides an indication of a tangential force schematically shown at 44. The tangential force is in a direction tangential to the direction of rotation. The accelerometer 36 also provides an indication of a radial force 46 that is perpendicular to the tangential force schematically shown at 44.

Similarly, the second accelerometer 38 provides an indication of a tangential force schematically shown at 48 and an indication of a radial force schematically shown at 50 that is perpendicular to the tangential force shown at 48. The indications from the accelerometers 36 and 38 result from rotation of the rotating member 26 and gravity. In this example, the axis of rotation 40 is arranged horizontally so that the effect of gravity on the accelerometers 36 and 38 does not require any compensation. If the axis of rotation 40 were arranged other than horizontal, additional processing by the controller 32 may be required for determining position depending on the needs of a particular situation. In an example in which the axis of rotation 40 is oriented at an angle (Φ) measured from the horizontal direction, the acceleration due to gravity acting on the accelerometers will be reduced by a factor of cos(Φ) is always in a vertical direction. If the axis of rotation 40 were truly vertical, the illustrated example will not provide the desired position information because the effect of gravity is zero all the time.

Given the arrangement shown in FIG. 2, the indications from the accelerometers 36 and 38 can be described by the following equations.

$$a_1(t) = r\omega^2(t) + g\sin(\theta(t)), \quad a_2(t) = -r\omega^2(t) + g\sin(\theta(t)),$$

$$\hat{a}_1(t) = r\frac{d\omega(t)}{dt} - g\cos(\theta(t)), \quad \hat{a}_2(t) = -r\frac{d\omega(t)}{dt} - g\cos(\theta(t)).$$

The indications from the accelerometers as indicated by the above equations allow for determining a position of the rotating member 26 that can be described by an angle schematically shown at 52 relative to a reference position 54, for example. The angle can be determined from the following:

$$\frac{a_1(t)+a_2(t)}{2g} = \sin(\theta(t)), \quad \frac{\hat{a}_1(t)+\hat{a}_2(t)}{-2g} = \cos(\theta(t)).$$

For example, it is possible to use sine and cosine signals in order to get the angle information, directly. Alternatively, a tangent signal can be obtained from the sine and cosine signals and the angle information is available from the known algorithm technique used in typical sine-cosine encoders.

In one example, the angle information is absolute given a selected reference from which to measure the angle, such as the one schematically shown at 54. The indications from the accelerometers 36 and 38 allow for determining the angle to provide the current position of the rotating member 26.

In some examples, the rotating member 26 will be the component of interest. In such cases, the position information regarding the rotating member is the desired position information. In other examples, the position of the component of interest is related to the position of the rotating member 26. In some examples, it will be another rotating component or a part of the motor 22. In an elevator system, for example, keeping track of the rotational position of a motor component or a traction sheave (i.e., a rotating member) allows for determining the vertical position of the elevator car because of a known relationship between movement of such a rotating member and the elevator car. Given this description, those skilled in the art will realize how to take position information regarding a selected rotating member and from that obtain the position information regarding the component of interest in their particular situation.

In some examples, the motor 22 remains in a fixed position relative to a stationary structure so that the only movement that would influence the indications from the accelerometer arrangement 30 is the rotary movement discussed above. In some situations, the motor 22 might be at least slightly moveable in a rotary direction (e.g., about the axis 40), which movement is distinct from the monitored rotation of the rotating member 26. For example, the motor 22 may be mounted in a way that allows for some change in motor position. The example of FIG. 1 includes a sensor 56 for detecting such motion of the motor 22. The controller 32 in one such example is programmed to use information from the sensor 56 to compensate for any effect that such additional rotary motion would have on the indications from the accelerometer arrangement 30 to maintain accuracy in position information obtained from the accelerometer arrangement 30. In one example, the sensor 56 comprises another accelerometer. Another example includes a different known sensor that will provide an indication of movement to meet the needs of a particular situation.

The example of FIG. 2 includes two force indications from each of the accelerometers. One feature of such an example implementation is that there is no need to use a starting position as a reference to determine the current position information. In some examples, each accelerometer will provide only one of the tangential force or the radial force indication. In such examples a starting position reference is utilized to determine the actual position. A known locked rotor test is used for determining a starting position (e.g., starting electrical angle) in one example. In an elevator system example, the starting position can be determined based on already available elevator system position information. Given this description, those skilled in the art will be able to select an appropriate way to obtain starting position information to allow for using only one force indication from an accelerometer to obtain the desired position information.

Figure 3:
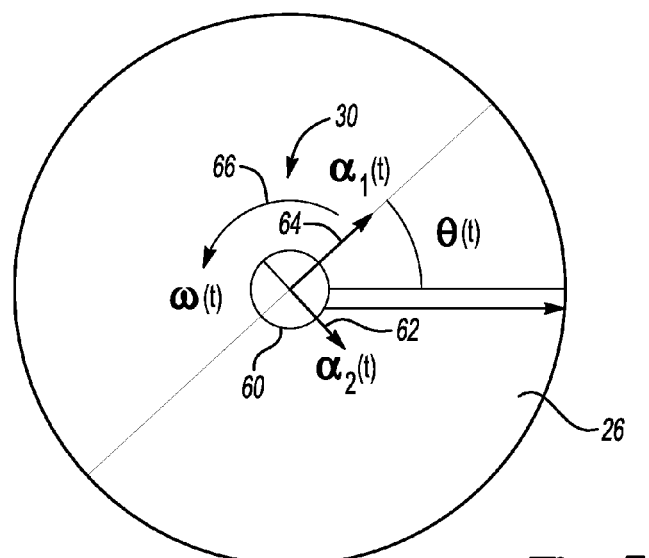
FIG. 3 schematically illustrates an alternative arrangement to that shown in FIG. 2.

The example of FIG. 2 includes multiple accelerometers supported on the rotating member 26. Another example is shown in FIG. 3 in which a single accelerometer 60 is supported on the rotating member 26. The accelerometer 60 is centered about the axis of rotation 40. The accelerometer 60 provides radial force indications schematically shown at 62 and 64 responsive to rotation of the rotating member 26 as schematically shown by the arrow 66. A multiple axis accelerometer 60 is used in one such example. Assuming the direction of the arrows are the positive directions of the accelerometer 60, the accelerometer 60 is measuring negative radial forces.

The radial force indications in this example can be described using the following equations.

$$a_1(t) = -r\omega(t)^2 - g\sin(\theta(t)),$$

$$a_2(t) = -r\omega(t)^2 - g\sin(\theta(t)-90°).$$

Subtracting one signal from the other yields $$a_1(t) - a_2(t) = -g[\sin(\theta(t)) - \sin(\theta(t)-90°)]. \quad (1)$$

Using the relationship $$\sin(x) - \sin(y) = 2\cos\left(\frac{x+y}{2}\right)\sin\left(\frac{x-y}{2}\right),$$

equation (1) becomes $$a_1(t) - a_2(t) = -2g\cos\left(\frac{2\theta(t)-90°}{2}\right)\sin(45°). \quad (2)$$

The following angular position information is available from equation (2)

$$\theta(t) = \cos^{-1}\left(\frac{a_1(t)-a_2(t)}{-2g\sin(45°)}\right) + 45°.$$

Depending on the configuration and nature of the rotating member 26, the arrangement of FIG. 3 or FIG. 2 may be used to meet the needs of a particular situation. Additionally, it is possible to use single axis accelerometers with some reference position or starting position information in place of the multiple axis accelerometers. At least one of a tangential force or a radial force indication from at least one accelerometer to provide an indication of position information.

Figure 4:
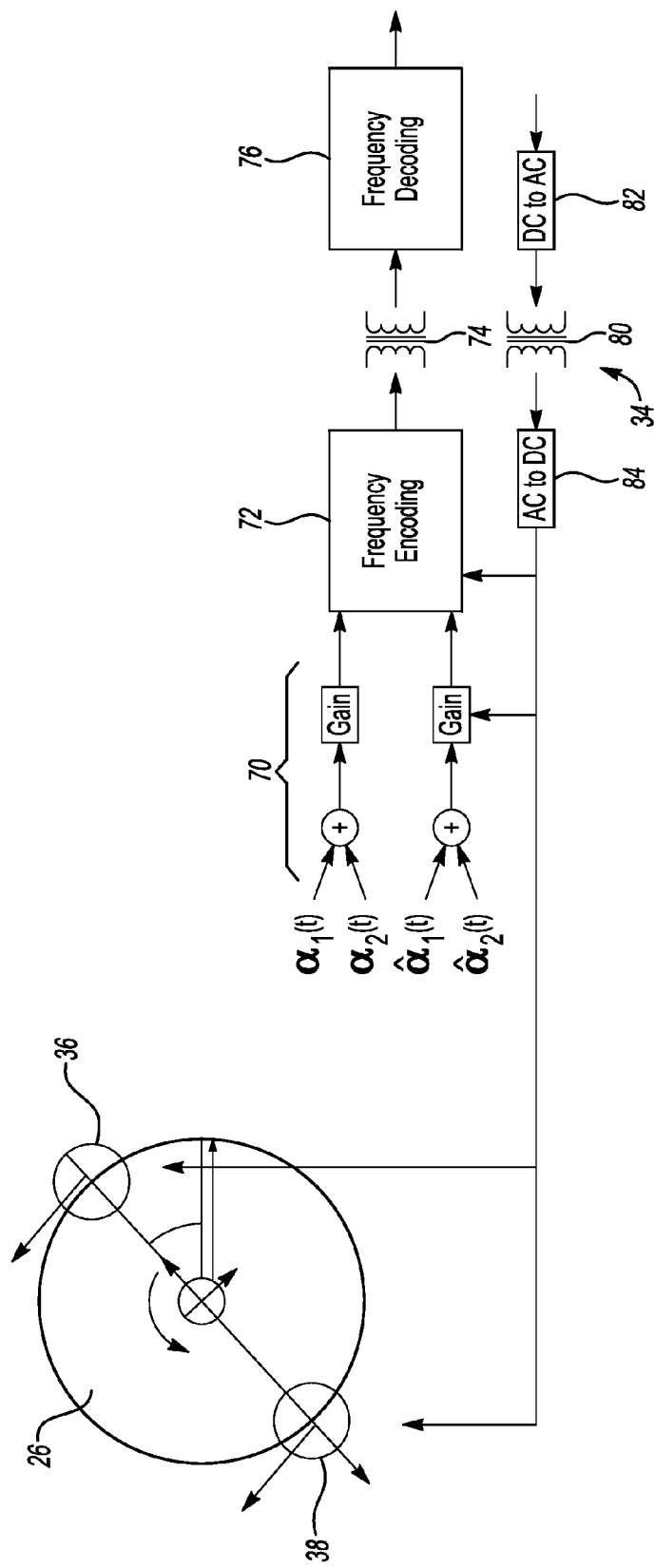
FIG. 4 schematically shows selected portions of the example of FIG. 1.

FIG. 4 schematically shows an example configuration of a non-contact coupling 34. In this example, the output or indications from the accelerometers 36 and 38 are provided by gain circuitry 70 and a frequency encoder 72. An inductive coupling 74 such as a rotary transformer allows for communicating between the frequency encoder 72 and a frequency decoder 76. The controller 32 (FIG. 1) is coupled with the frequency decoder 76 in one example. In another example, the frequency decoder 76 is part of the controller 32. The rotary transformer 74 allows for communicating the indications or outputs from the accelerometers to the controller 32 for making position determinations.

The encoding and decoding provided in the example of FIG. 4 allows for high frequency data signal transmission. Some examples include voltage-to-frequency conversion. Other examples include frequency modulation or pulse-code-modulation. One example includes two channels for signal transmission between the frequency encoder 72 and the frequency decoder 76. One of the channels could be used for communicating cosine information while the other channel could be used for communicating the sine indications. In another example, only one channel is used between the encoder 72 and the decoder 76 to communicate tangent indications from the accelerometers 36 and 38 to the controller 32.

Other non-contact couplings 34 include wireless transmission techniques, for example using known Bluetooth techniques.

The example of FIG. 4 includes another rotary transformer 80 for providing power to the accelerometers 36 and 38, for example. A DC to AC converter 82 is situated on the controller side of the rotary transformer 80 while an AC to DC converter 84 is situated on the accelerometer side. Such an arrangement allows for a non-contact power coupling with the accelerometers of the accelerometer arrangement 30.

Figure 5:
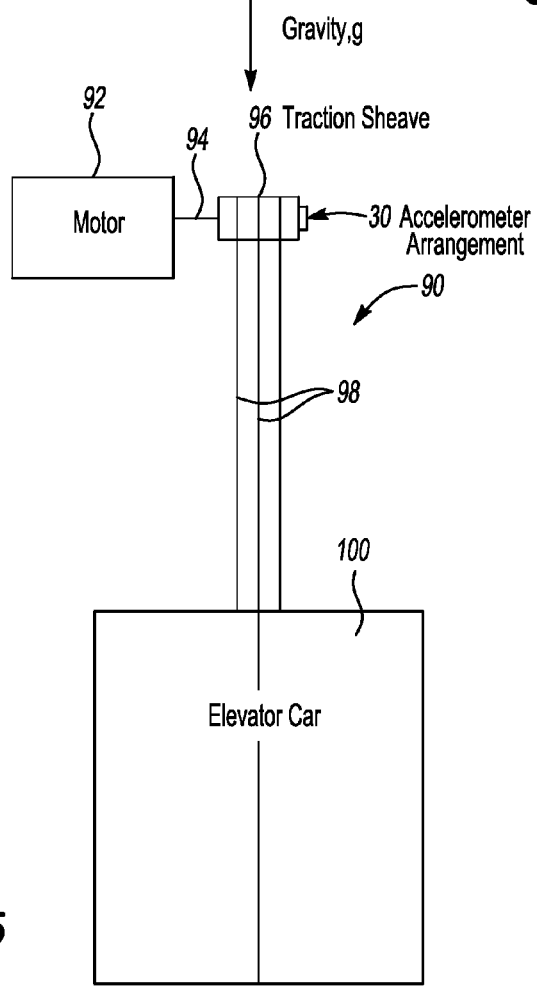
FIG. 5 schematically shows selected portions of an elevator system incorporating a device like that shown in FIG. 1.

FIG. 5 schematically shows selected portions of an elevator system 90 in which the position determining device 20 is useful. Other components of the elevator system 90 (e.g. guide rails, safeties, etc.) that are not relevant to the present invention are not discussed herein. An elevator machine 92 of the elevator system 90 includes a motor and brake. An output shaft 94 of the motor of the machine 92 causes rotation of a traction sheave 96. In some examples, the traction sheave 96 is the output shaft of the motor of the machine 92. In this example, the accelerometer arrangement 30 is supported on the traction sheave 96. In other words, the traction sheave 96 is the rotating member used for determining position information. A traction and suspension assembly 98 supports an elevator car 100 and moves over the traction sheave 96 to cause corresponding movement of the elevator car 100. Using the position determining device 20 facilitates determining a vertical position of the elevator car 100 within a hoistway, for example. Those skilled in the art will realize how to use position information regarding the rotary position of the traction sheave 96 for purposes of determining the corresponding vertical position of the elevator car 100.

In another elevator system application, the motor of interest is used for moving elevator car doors between open and closed positions. Motor component position information (or that of a related rotating component) is useful for determining whether the doors are fully closed, for example. The accelerometer arrangements of FIG. 2 or 3 are useful for such a determination.

The disclosed examples provide a way of determining position information based upon rotation of a rotating member that rotates responsive to operation of a motor. The accelerometer arrangement provides information to determine the position without requiring relatively expensive encoders, for example. The position determining device of the disclosed examples is useful for a variety of situations and those skilled in the art who have the benefit of this description will realize how to implement it to meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for determining a position of a component moved by operation of a motor, the device comprising:
   a rotating member that rotates responsive to operation of the motor;
   at least one accelerometer supported on the rotating member, the accelerometer providing an indication of at least one of a tangential force that is tangential to a direction of rotation of the rotating member and a radial force that is perpendicular to the tangential force; and
   a controller that determines a position of the component based on the at least one force indication from the at least one accelerometer;
   wherein
   the motor is moveable in a rotary direction that is distinct from rotation of the rotating member,
   the device comprises a sensor that provides an indication of an amount of motor movement in the rotary direction and
   the controller uses the indication of the amount of motor movement to cancel out any effect of the motor movement on the determination of the position of the component.

2. The device of claim 1, wherein there are two accelerometers supported on the rotating member, the two accelerometers being spaced apart from each other and diametrically opposed to each other on opposite sides of an axis of rotation of the rotating member.

3. The device of claim 1, wherein the at least one accelerometer is a single accelerometer that provides the at least one force indication and the single accelerometer is situated on an axis of rotation of the rotating member.

4. The device of claim 1, wherein the rotating member comprises a sheave of an elevator system.

5. The device of claim 4, wherein the sheave comprises a traction sheave that rotates responsive to operation of the motor to cause movement of an associated elevator car.

6. The device of claim 4, wherein the component is an elevator car that is vertically moveable responsive to rotational movement of the traction sheave and the device provides an indication of a vertical position of the elevator car.

7. The device of claim 1, wherein the rotating member rotates about an axis of rotation that is horizontal.

8. The device of claim 1, wherein the rotating member is a portion of the motor.

9. The device of claim 1, wherein the at least one accelerometer provides an indication of the tangential force and the radial force.

10. An elevator system, comprising:
    an elevator car;
    a machine that includes a motor;
    a traction sheave that rotates responsive to operation of the motor;
    a traction and suspension assembly that supports the elevator car and, when the motor operates and moves the traction sheave, causes corresponding movement of the elevator car;
    at least one accelerometer supported on a rotating member that rotates responsive to operation of motor, the accelerometer providing an indication of at least one of a tangential force that is tangential to a direction of rotation of the rotating member and a radial force that is perpendicular to the tangential force; and
    a controller that determines a position of the elevator car based on the at least one force indication from the at least one accelerometer;

wherein
the motor is moveable in a rotary direction that is distinct from rotation of the rotating member,
the device comprises a sensor that provides an indication of an amount of motor movement in the rotary direction and
the controller uses the indication of the amount of motor movement to cancel out any effect of the motor movement on the determination of the position of the component.

11. The system of claim 10, wherein there are two accelerometers supported on the rotating member, the two accelerometers being spaced apart from each other and diametrically opposed to each other on opposite sides of an axis of rotation of the rotating member.

12. The system of claim 10, wherein the at least one accelerometer is a single accelerometer that provides the at least one force indication and the single accelerometer is situated on an axis of rotation of the rotating member.

13. The system of claim 10, wherein the rotating member comprises the traction sheave.

14. The system of claim 10, wherein the rotating member rotates about an axis of rotation that is horizontal.

15. The system of claim 10, wherein the at least one accelerometer provides an indication of the tangential force and the radial force.

16. A method of determining a position of a component moved by operation of a motor, comprising the steps of:
providing at least one accelerometer on a rotating member that rotates responsive to operation of the motor;
providing an indication of at least one of a tangential force that is tangential to a direction of rotation of the rotating member and a radial force that is perpendicular to the tangential force, the indication being provided by the at least one accelerometer, and
determining the position of the component based on the force indications;
wherein
the motor is moveable in a rotary direction that is distinct from rotation of the rotating member,
providing a sensor that provides an indication of an amount of motor movement in the rotary direction and
using the indication of the amount of motor movement to cancel out any effect of the motor movement on the determination of the position of the component.

17. The method of claim 16, wherein there are two accelerometers supported on the rotating member, the two accelerometers being spaced apart from each other and diametrically opposed to each other on opposite sides of an axis of rotation of the rotating member.

18. The method of claim 16, wherein the at least one accelerometer is a single accelerometer that provides the force indications and the single accelerometer is situated on an axis of rotation of the rotating member.

19. The method of claim 16, comprising providing the at least one accelerometer on a traction sheave that rotates responsive to operation of the motor to cause movement of an associated elevator car.

20. The method of claim 19, comprising determining a vertical position of the elevator car.

21. The method of claim 16, wherein the rotating member is a portion of the motor.

22. The method of claim 16, wherein the at least one accelerometer provides an indication of the tangential force and the radial force.

* * * * *